US006062714A

United States Patent [19]

Serizawa et al.

[11] Patent Number: 6,062,714

[45] Date of Patent: May 16, 2000

[54] VEHICLE HEADLIGHT

[75] Inventors: Hiroyuki Serizawa; Satoshi Yamamura, both of Shizuoka, Japan

[73] Assignee: Koito Manufacturing Co., Ltd., Tokyo, Japan

[21] Appl. No.: 08/900,537

[22] Filed: Jul. 25, 1997

[30] Foreign Application Priority Data

Jul. 25, 1996 [JP] Japan .................................... 8-214243

[51] Int. Cl.[7] ........................................................ B60Q 1/04

[52] U.S. Cl. ............................................ 362/518; 362/297

[58] Field of Search .................................... 362/517, 518, 362/297, 346

[56] References Cited

U.S. PATENT DOCUMENTS 5,215,368 6/1993 Neumann ................................ 362/518
5,299,101 3/1994 Serizawa .................................. 362/61
5,544,021 8/1996 Lopez et al. ............................ 362/518

FOREIGN PATENT DOCUMENTS 43 02 907 8/1993 Germany .

*Primary Examiner*—Stephen Husar
*Attorney, Agent, or Firm*—Sughrue, Mion, Zinn, Macpeak & Seas, PLLC

[57] ABSTRACT

A reflecting surface 22, of a reflector 16, includes a first reflecting surface region 22A which is a substantially upper half of the reflecting surface with respect to the optical axis AX of the reflector. The first reflecting surface region 22A reflects light to form a sub light flux distribution pattern P. The reflecting surface 22 also includes a second reflecting surface region 22B, which is located below the optical axis Ax of the reflector. The second reflecting surface region 22B reflects light to form a wide diffusion-distribution pattern Pw in a part of the light-distribution subpattern P near the vehicle. The wide diffusion-distribution pattern PW has a horizontal diffusion angle larger than the maximum horizontal diffusion angle of the light-distribution subpattern P.

17 Claims, 8 Drawing Sheets

VEHICLE HEADLIGHT

BACKGROUND OF THE INVENTION

This invention relates to a vehicle headlight with a discharge bulb and more particularly, to a light-distribution subpattern forming headlight.

Recently, a discharge lamp has been employed as the light source of a vehicle headlight, because it is able to perform a high brightness irradiation.

In the case of a headlight having a discharge lamp, a light-distribution subpattern having an oblique cut line and a horizontal cut line is formed, the resultant pattern is high in distant recognition, and wide in irradiation angle.

The power of the discharge lamp is great. Hence, the light-distribution subpattern is formed by light reflected from a region of the reflecting surface which is only a substantially upper half of the reflecting surface with respect to the optical axis of the reflector.

As was described above, the light-distribution subpattern is formed only by the light reflected from the region of the reflector reflecting surface which is a substantially upper half thereof with respect to the optical axis of the reflector. However, the light advancing towards the remaining reflecting surface region is not used at all. This is not economical or efficient. In addition, in order to improved the traveling safety of a vehicle at night, it is desirable to utilize the output light of the discharge bulb as much as possible.

SUMMARY OF THE INVENTION

In view of the foregoing, an object of the invention is to provide a vehicle headlight that forms a light-distribution subpattern with a discharge bulb, wherein the headlight improves lamp efficiency and driving safety of a vehicle at night.

The foregoing object of the invention has been achieved by the utilization of the lower reflecting surface region of the reflector as a reflecting surface region to reflect a predetermined wide diffusion-distribution pattern to complement the light-distribution subpattern.

That is, a vehicle headlight comprises a discharge bulb, and a reflector having a reflecting surface adapted to reflect forwardly the output light of the discharge bulb, thereby forming a light-distribution subpattern having an oblique cut line and a horizontal cut line. The reflecting surface includes a first reflecting surface region which is a substantially upper half of the reflecting surface with respect to the optical axis of the reflector. The first reflecting surface region is so designed as to form the light-distribution subpattern when light from the discharge bulb is reflected from the first reflecting surface region. The reflecting surface also includes a second reflecting surface region which is located below the optical axis of the reflector. The second reflecting surface region reflects downwardly, in a deflection mode, the light output from the discharge bulb and reflects horizontally, in a diffusion mode, the light output from the discharge bulb, so that light reflected from the second reflecting surface region forms, in the part of light-distribution subpattern near a vehicle, a wide-diffusion light-distribution subpattern which has a horizontal-diffusion angle larger than the maximum horizontal-diffusion angle of the light-distribution subpattern.

The aforementioned "second reflecting surface region" is not particularly limited in width, position, and so forth as long as it is possible to form the "wide diffusion-distribution pattern". For instance, in the case where a shade is provided near the discharge bulb, the shade includes a front end portion adapted to intercept light emitted forwardly from the discharge bulb. Further, the shade includes a pair of legs through which the front end portion is secured to the reflector, wherein the upper edges of the pair of legs form an oblique cut line and a horizontal cut line. The second reflecting surface region may be a reflecting surface region which is located between the shadows of the pair of legs.

Furthermore, the "second reflecting surface region" may be of a single curved surface; however, the second reflecting surface region may comprise a plurality of reflecting surface elements.

The "second reflecting surface region" is so designed as to reflect downwardly, in a deflection mode, the light output form of the discharge bulb, and reflect horizontally, in a diffusion mode, the light output from the discharge bulb. To reflect the light output from the discharge bulb downwardly in a deflection mode, the following arrangements may be employed.

The vertical section of the first reflecting surface region is generally parabolic; however, the vertical section of the second reflecting surface region is also made parabolic, and the parabolic axis of the second reflecting surface region may be directed downwardly with respect to the parabolic axis of the first reflecting surface region; and the parabolic axis of the second reflecting surface region may be located below the parabolic axis of the first reflecting surface region; and the parabolic focal length of the second reflecting surface region may be longer than the parabolic focal length of the first reflecting surface region.

As was described above, the first reflecting surface region, which is a substantially upper half of the reflecting surface with respect to the optical axis of the reflector, forms the light-distribution subpattern when light from the discharge bulb is reflected from the first reflecting surface region. Further light reflected from the second reflecting surface region forms, in a part of the light-distribution subpattern near the vehicle, a wide-diffusion light-distribution subpattern which has a horizontal diffusion angle larger than the maximum horizontal-diffusion angle of the sub light distribution pattern.

Hence, the sub light distribution pattern is utilized to visually recognize objects in front of the vehicle, and the wide diffusion distribution pattern makes it easy for the driver to find a walker who comes in front of the vehicle from side. That is, the auxiliary function of the light-distribution subpattern is sufficiently performed.

Hence, the present invention vehicle headlight that forms a light-distribution subpattern with the light output from a discharge bulb is high in lamp efficiency and in driving safety of the vehicle at night.

In the discharge bulb, metal iodide is deposited on the lower portion of the inner wall of the ball-shaped section which forms the discharge chamber of the discharge bulb. Hence, the light advancing downwardly from the discharge bulb is colored yellow by the metal iodide. Hence, the light reflected from the second reflecting surface region, which is located below the optical axis of the reflector, is colored yellow. With the yellowish wide, diffusion distribution pattern thus formed, in bad weather such as foggy weather and even at night, the front field of vision of the vehicle is sufficiently clear.

When the "second reflecting surface region" is made up of a plurality of reflecting surface elements, the aforementioned wide-diffusion-distribution pattern can be formed with ease.

DETAILED DESCRIPTION OF THE PREFERRED EMBODIMENTS

A preferred embodiment of the invention will be described with reference to the accompanying drawings.

Figure 1:
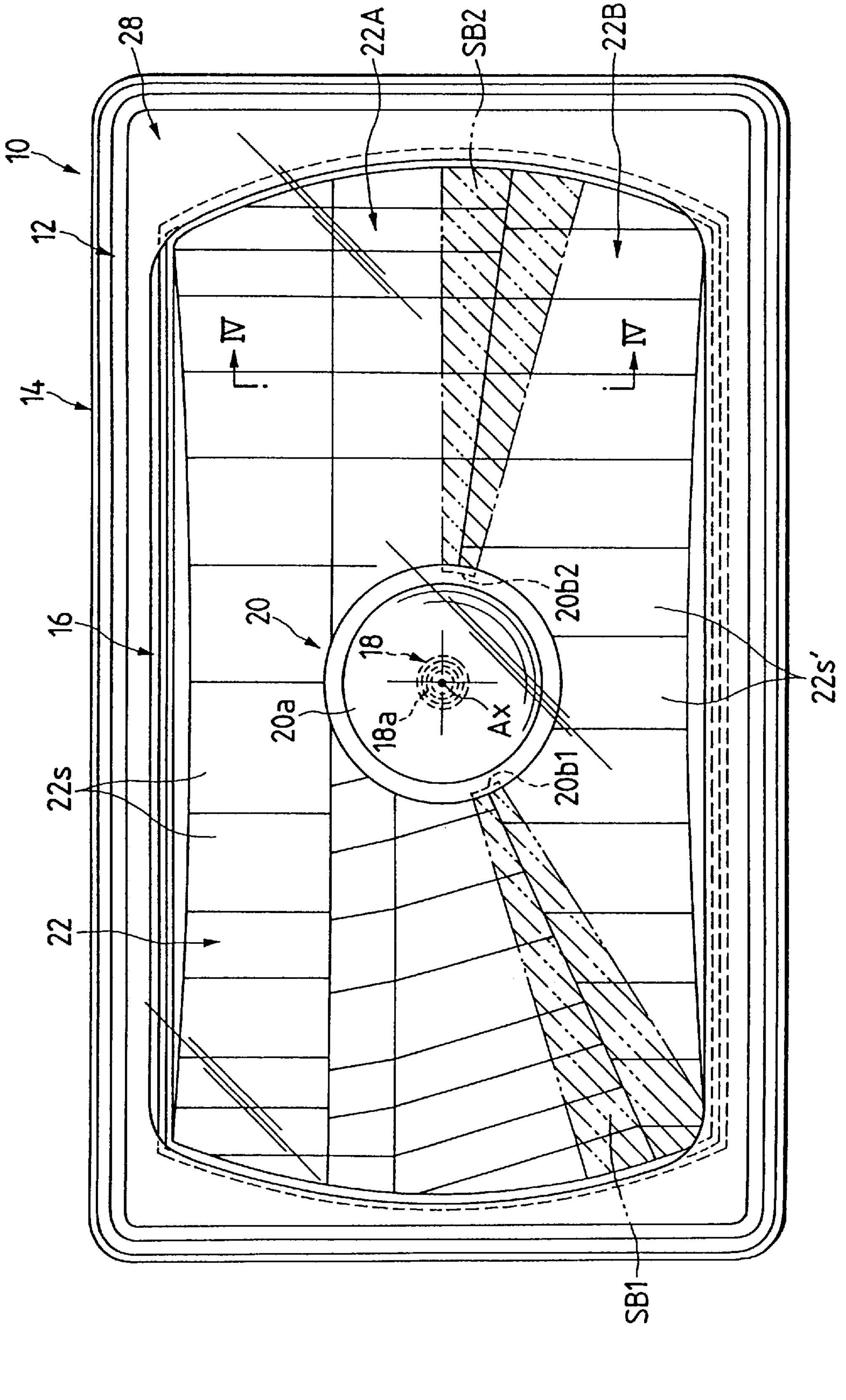
FIG. 1 is a front view of a vehicle headlight, which constitutes an embodiment of the invention.
Figure 2:
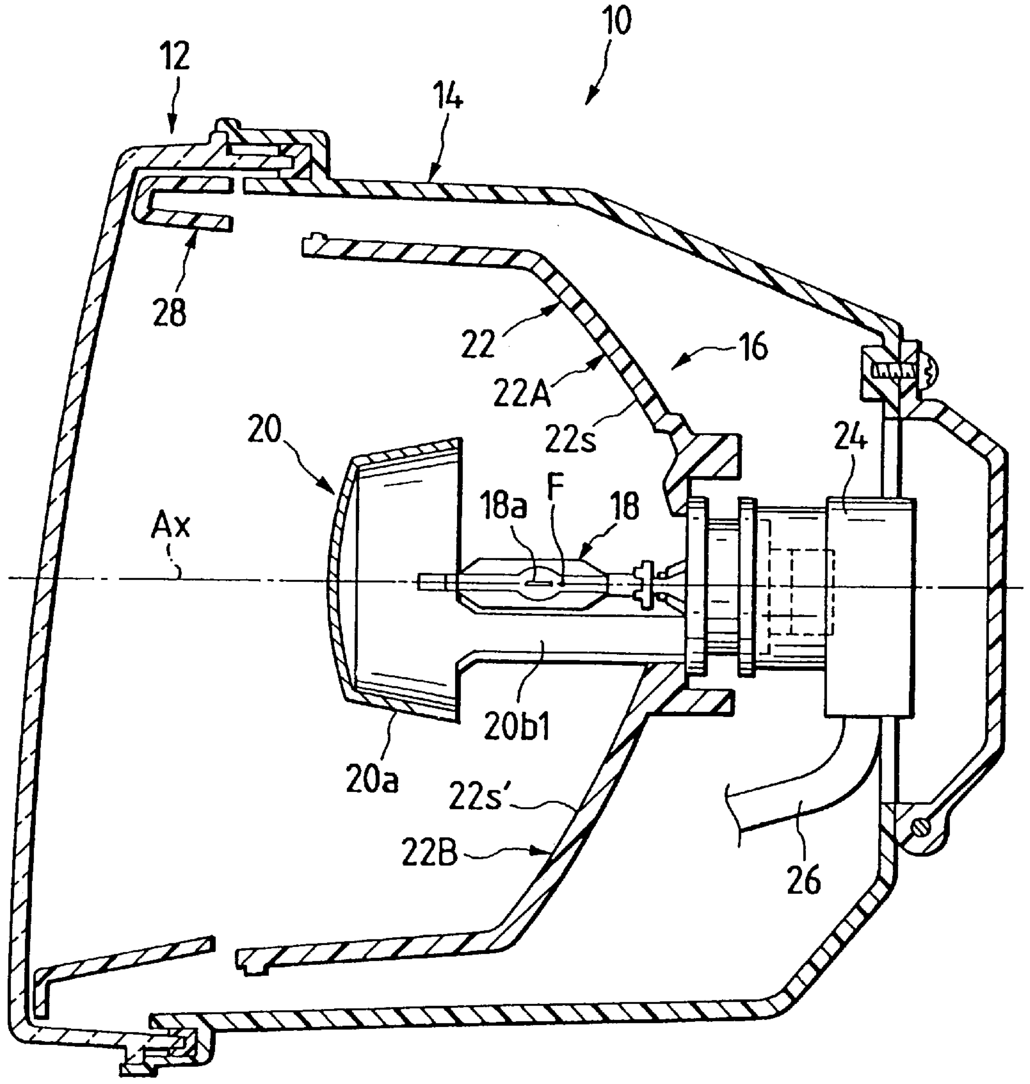
FIG. 2 is a sectional side view of the vehicle headlight shown in FIG. 1.

FIG. 1 is a front view of a vehicle headlight according to one embodiment of the invention; and FIG. 2 is a sectional side view of the vehicle headlight shown in FIG. 1.

Figure 3:
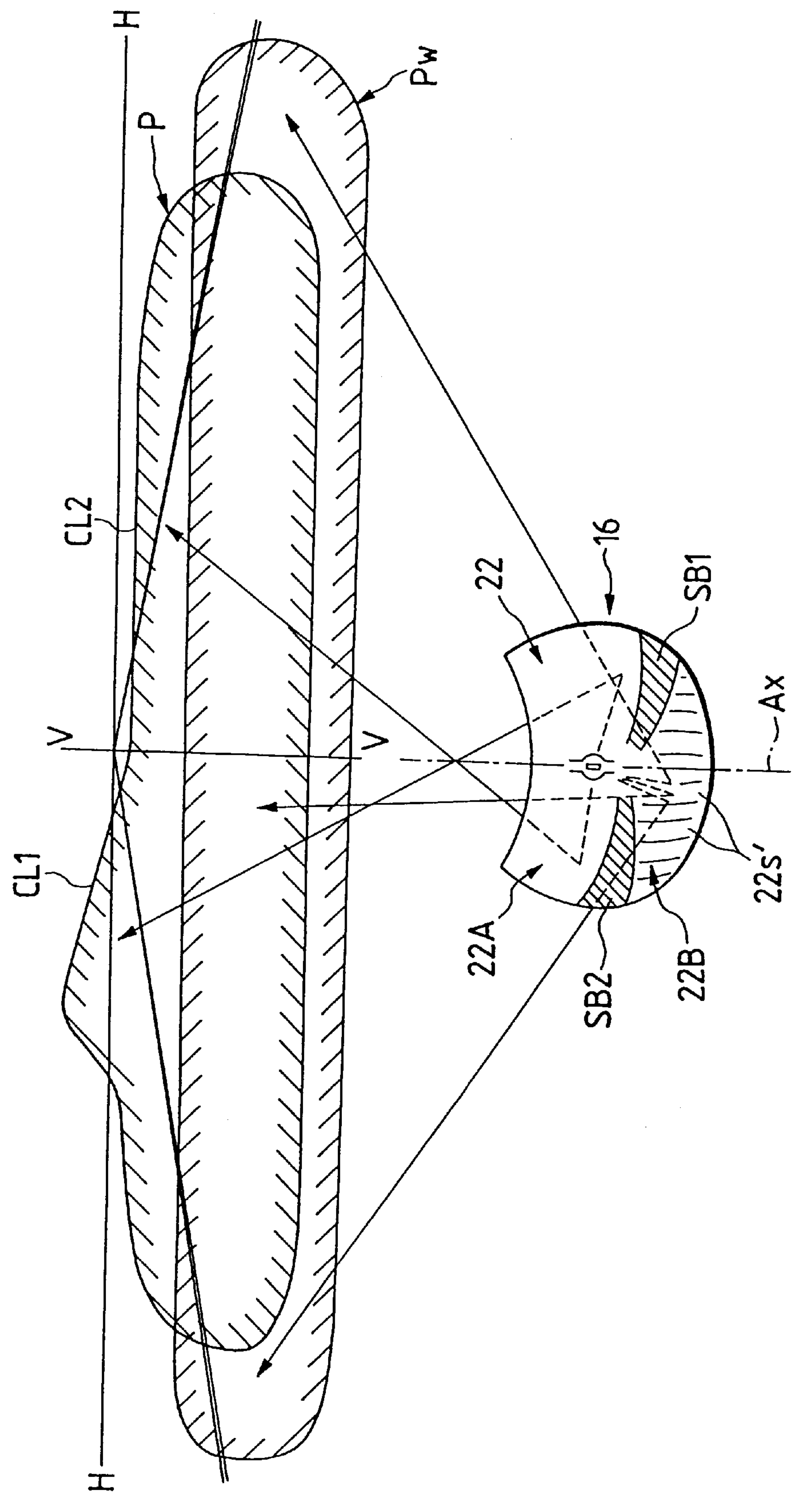
FIG. 3 is a screen-distribution-pattern diagram for a description of the function of the vehicle headlight.

As shown in FIGS. 1 and 2, in the vehicle headlight 10 of the invention, a lens 12 and a body 14 define a space, in which a reflector 16 with a discharge bulb 18 and a shade 20 is provided. The shade is vertically and horizontally tiltable, whereby, as shown in FIG. 3, a light-distribution subpattern P of left distribution type having an oblique cut line (15° cut line) CL1 and a horizontal cut line CL2 is formed.

The aforementioned lens 12 is a plain lens, and the above-described light-distribution subpattern P is formed by the reflector 16.

The reflecting surface 22 of the reflector 16 is designed as follows: A paraboloid of revolution with an optical axis Ax extending in a front-to-rear direction is employed as a reference surface. The reference surface is divided into a plurality of segments, to which reflecting surface elements 22*s* different in curvature from the reference surface are assigned. The curvature of those reflecting surface elements 22*s* are set to suitable values, to obtain the above-described light-distribution subpattern.

To form the light-distribution subpattern P, as shown in FIG. 1, the reflecting surface 22 includes a reflecting surface region 22A which is substantially an upper half of the reflecting surface with respect to the optical axis Ax. Light reflected from this reflecting surface region 22A is utilized to form the light-distribution subpattern, (as described later).

The discharge bulb 18 is a metal halide discharge bulb, and its optical axis (reference axis) is the same as the optical axis Ax of the reflector 16. The discharge bulb 18 is mounted on the reflector 16 in such a manner that its light emitting section (arc) 18*a* is slightly ahead of the focal position F of the paraboloid of revolution which is the reference surface of the reflector 16. In order to turn on the discharge bulb 18, a high voltage is required. Therefore, the discharge bulb 18 is connected through a bulb socket 24 and the high voltage cord 26 to a lighting circuit (not shown). An extension 28 is provided in front of the above-described reflector 16.

The above-described shade 20 comprises: a cup-shaped front end portion 20*a* which covers the front of the discharge bulb 18; a pair of legs 20*b*1 and 20*b*2 whose rear ends are fixedly secured to the reflector 16. The front end portion 20*a* intercepts the light beam which advances towards the front of the lamp from the discharge bulb 18, while the pair of legs 20*b* intercept the discharge bulb's light beams which advance to predetermined right and left regions of the reflecting surface 22 of the reflector 16.

On the reflecting surface 22 of the reflector, the shadows SB1 and SB2 of the pair of legs 20*b*1 and 20*b*2 are formed radially; however, it should be noted that the aforementioned light-distribution subpattern P is formed by light reflected from the reflecting surface region 22A which is located above the pair of shadows SB1 and SB2. In this operation, the upper edge of the right leg 20*b*1 forms the aforementioned oblique cut line CL1, while the upper edge of the left leg 20*b*2 forms the horizontal cut line CL2.

In the reflecting surface region 22B, of the reflecting surface 22, is located below the pair of shadows SB1 and SB2. Light reflected from the reflecting surface region 22B, as shown in FIG. 3, forms a wide diffusion distribution pattern PW in front of the sub light distribution pattern P. The wide diffusion distribution pattern PW has a horizontal diffusion angle which is larger than the maximum horizontal-diffusion angle of the light-distribution subpattern P. The reflecting surface region 22B is formed in the same manner as the above-described described reflecting surface region 22A. That is, a predetermined reference surface (which is a paraboloid of revolution different in focal length and in focal position from the paraboloid of revolution which forms the reference surface of the reflecting surface region 22A) is divided into a plurality of segments, and reflecting surface elements 22*s*' which are different in curvature from the aforementioned reference surface are assigned to those segments. Those reflecting surface elements 22*s*' reflect downwardly the light output from the discharge bulb, and reflect it horizontally in a diffuse mode.

Figure 4:
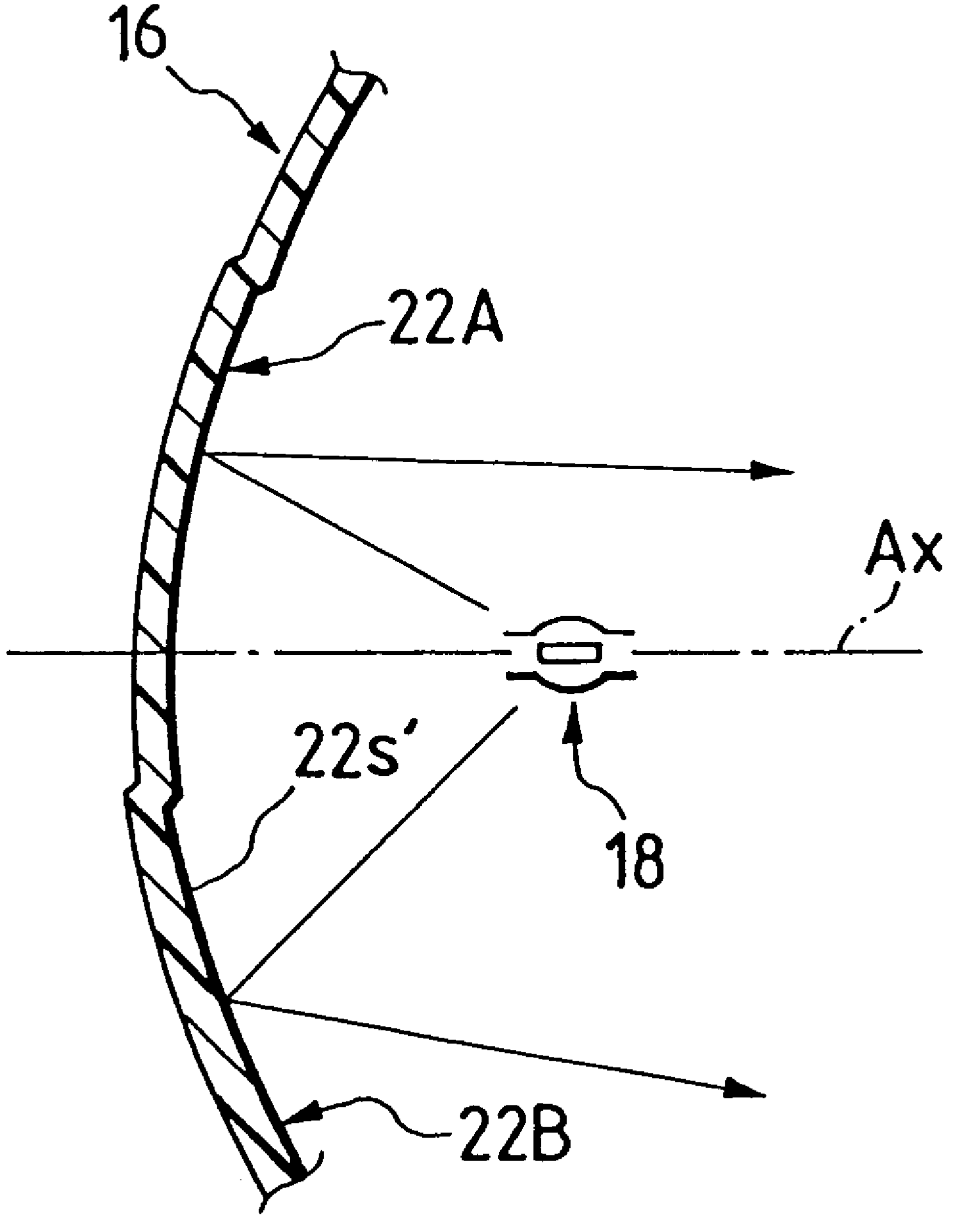
FIG. 4 is a sectional view taken along line IV—IV in FIG. 1.
Figure 5A:
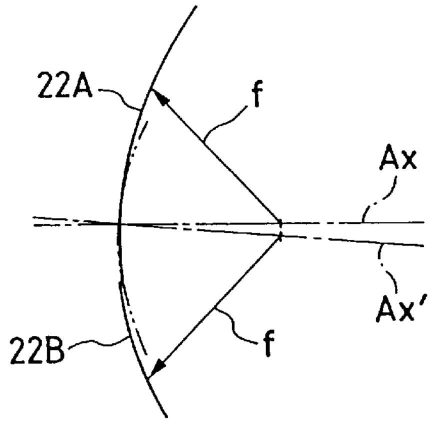
FIG. 5(*a*) is a diagram corresponding to FIG. 4, showing a concrete example of a reflecting surface, and FIGS. 5(*b*) and 5(*c*) are diagrams showing modifications of the reflecting surface shown in FIG. 5(*a*)
Figure 5B:
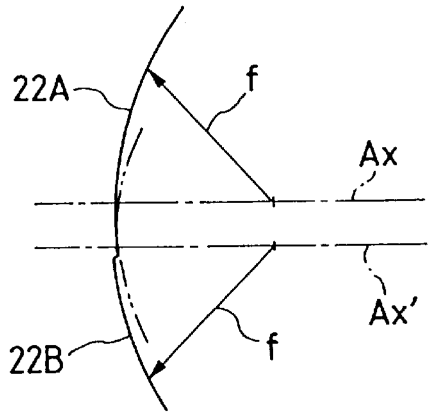
Figure 5C:
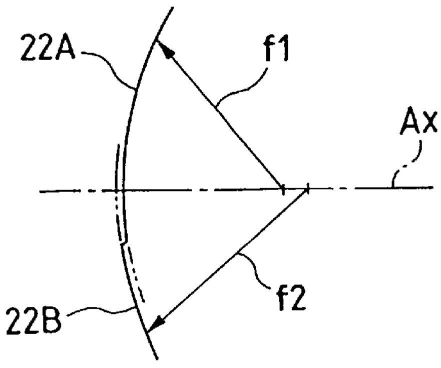

As with the reflecting surface region 22A, a vertical section of the reflecting surface region 22B is a parabola having a focal distance f. On the other hand, as shown in FIG. 4 which is a sectional view taken along line IV—IV in FIG. 1, the parabolic axis Ax' of reflecting surface region 22B extends down in order to downwardly deflect the light reflected from the reflecting surface elements 22*s*' forming the reflecting surface region 22B. As shown in FIG. 5(*a*), the parabolic axis Ax' of the reflecting surface region 22B is extended downwardly with respect to the parabolic axis Ax of the reflecting surface region 22A (which is in parallel with the optical axis Ax of the reflector).

As was described above, the light reflected from the reflecting surface region 22A, which is a substantially upper half of the reflector 16 with respect to the optical axis Ax of the reflector 16, forms the light-distribution subpattern P. Additionally, the light reflected from the reflecting surface region 22B, located below the optical axis Ax, forms the wide diffusion distribution pattern Pw in a part of the light-distribution subpattern P near the vehicle. The wide-diffusion-distribution pattern PW has a horizontal-diffusion angle larger than the maximum horizontal diffusion angle.

Hence, with the light-distribution subpattern, the driver is able to ensure the traveling safety of the vehicle when moving forward, and is able to quickly find a waling person who may appear in front of the vehicle suddenly from the side. Thus, the auxiliary functions of the light-distribution subpattern can be fully utilized.

Therefore, the light-distribution subpattern forming vehicle headlight, with the discharge bulb, of the invention is high in lamp efficiency and in night driving safety.

Figure 6:
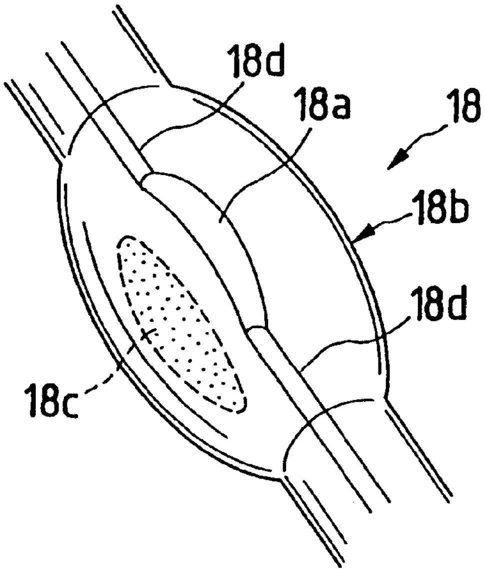
FIG. 6 is a perspective view of a discharge bulb in the above-described vehicle headlight.

Furthermore, the aforementioned wide diffusion-distribution pattern Pw is formed by the utilization of light reflected from the reflecting surface region 22B which is located below the optical axis Ax. This feature provides the following effects and merits;

That is, as shown in FIG. 6, metal iodide 18*c* is deposited on the lower portion of the inner wall of a ball-shaped section 18*b* which forms the discharge chamber of the discharge bulb 18. Hence, the light advancing downwardly from the light emitting section 18*a,* which is made up of a pair of electrode rods, is colored yellow. Hence, the light reflected from the reflecting surface region 22B is substantially colored yellow. With the yellowish wide diffusion distribution pattern Pw thus formed, the front field of vision of the vehicle is sufficiently clear even at night or in bad weather, such as in fog.

The reflecting surface region 22B is made up of a plurality of reflecting surface elements 22*s*' which reflect the output light of the discharge bulb 18 downwardly and reflect it horizontally in a diffusion mode. Hence, the aforementioned wide diffusion distribution pattern Pw can be formed with ease.

In the above-described embodiment, in order to downwardly deflect the light reflected from the reflecting surface elements 22*s*', which form the reflecting surface region 22B, as shown in FIG. 5(*a*) the parabolic axis Ax' of the reflecting surface region 22B extends downwardly with respect to the parabolic axis Ax of the reflecting surface region 22A. However, alternatively, as shown in FIG. 5(*b*), the parabolic axis Ax' of the reflecting surface region 22B may be laid below the parabolic axis Ax of the reflecting surface region 22A. In this arrangement, if the parabolic focal position of the reflecting surface region 22B is shifted behind the parabolic focal position of the reflecting surface region 22A, then the angle of downward deflection of the light thus reflected can be increased. Alternatively, as shown in FIG. 5(*c*), the parabolic focal length f2 of the reflecting surface region 22B may be longer than the parabolic focal length f1 of the reflecting surface region 22A. In addition, the arrangements of FIGS. 5(*a*), 5(*b*) and 5(*c*) may be suitably combined together in practical use.

Figure 7:
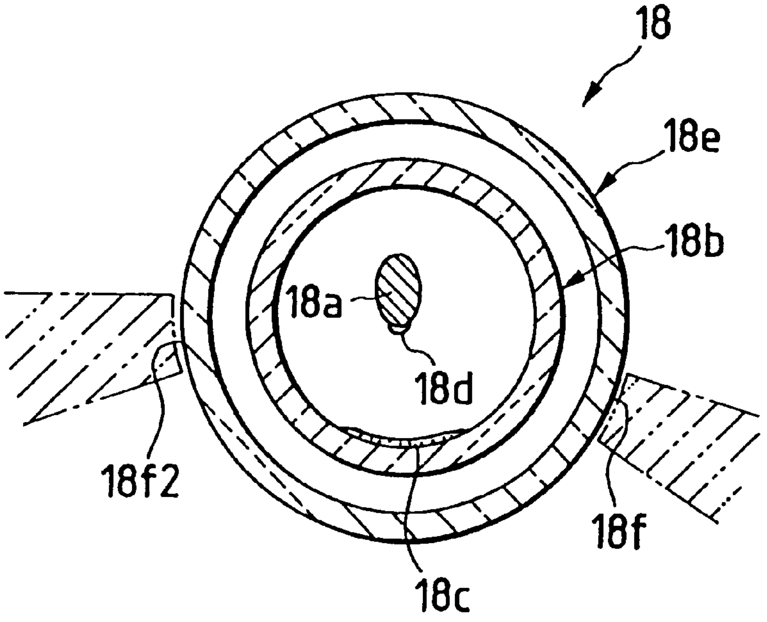
FIG. 7 is a sectional view of a discharge bulb, showing a modification of the above-described embodiment of the invention.

In the above-described embodiment, the pair of legs 20*b*1 and 20*b*2 of the shade 20 form the pair of shadow SB1 and SB2 on the reflecting surface 22, so that the light-distribution subpattern p formed by reflecting surface region 22A, and the wide diffusion-distribution pattern Pw formed by reflecting surface region 22B are distinguished from each other; however, the same effect can be obtained as follows: As shown in FIG. 7, a pair of black stripes (belt-shaped films) 18*f*1 and 18*f*2 are formed on the right and left sides of the outer tube 18*e* of the discharge bulb 18.

As was described above, in the reflecting surface 22 of the reflector 16, the reflecting surface region 22A is divided into a plurality of segments. In some designs it is desirable that, as shown in FIG. 8, the upper and lower border line L1 is provided above the upper and lower border line in the reflecting surface region 22A FIG. 1.

Figure 8:
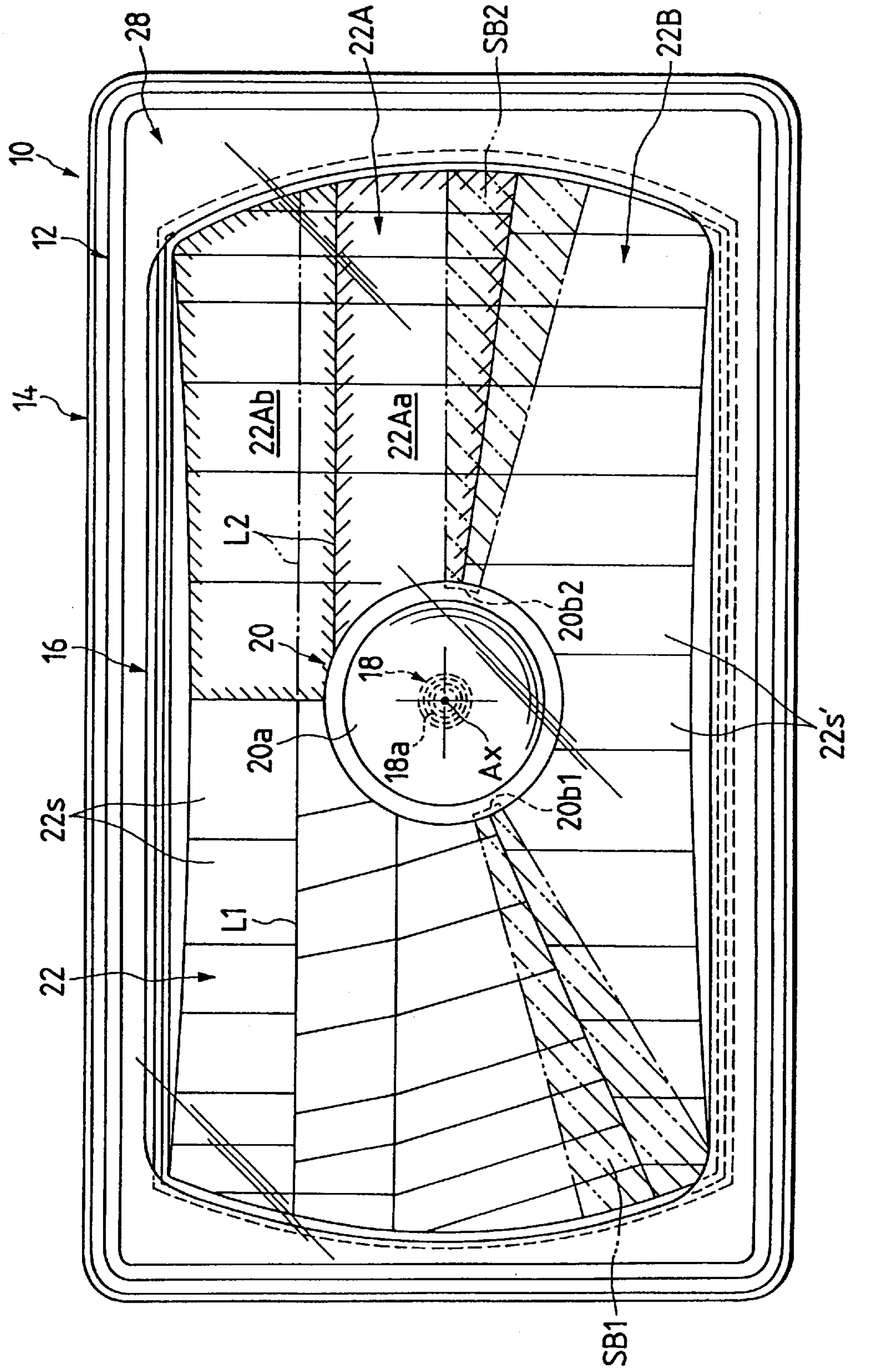
FIG. 8 is a front view corresponding to FIG. 1, showing a preferable position of an upper and lower border line in the case where a reflecting surface region forming a light-distribution subpattern is divided into a plurality of segments.

In this case, it is not desirable that the upper and lower border line L2 (located between the horizontal cut line forming region 22Aa and the region 22Ab located above the former 22Aa) is positioned at the same level as the upper and lower border line L1 as indicated by the two-dot chain line in FIG. 8; instead, in order to improve the lamp distribution, it is desirable that the upper and lower border line L2 is left positioned as indicated by the solid line in FIG. 8.

Figure 9:
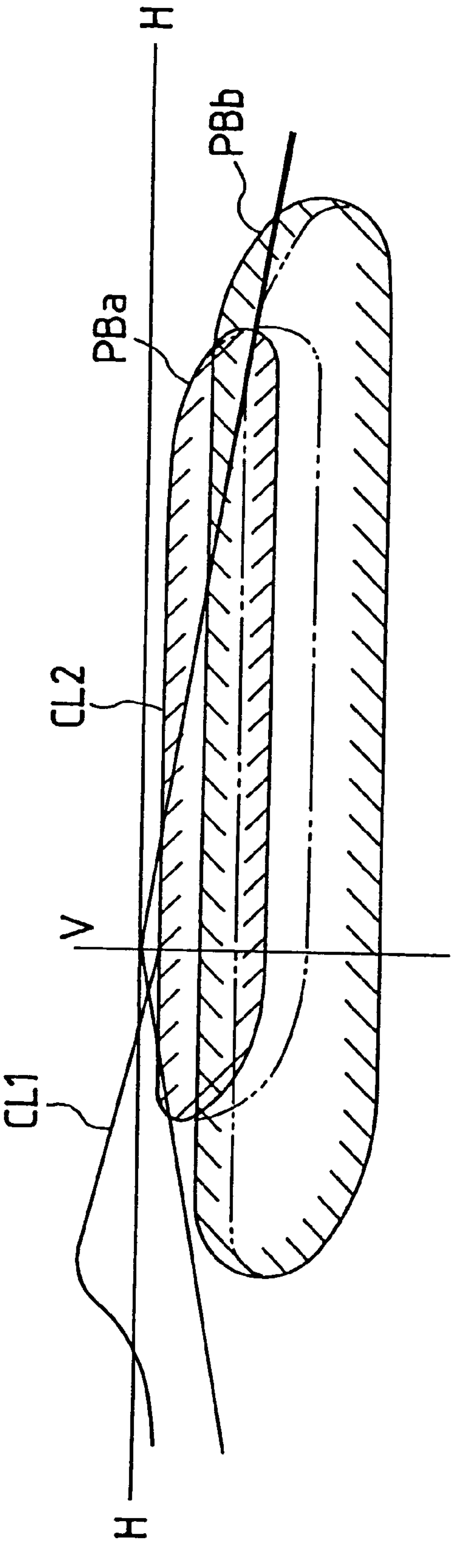
FIG. 9 is a screen-distribution-pattern diagram for a description of the arrangement of the vehicle headlight shown in FIG. 8.

That is, as shown in FIG. 9, the distribution pattern PBa formed by light reflected from the horizontal cut line forming region 22Aa is to irradiate objects which are located far away from the vehicle and, therefore, the pattern PBa is smaller in horizontal diffusion angle than the distribution pattern PBb formed by light reflected from the region 22Ab. Assume that the upper and lower border line L2 is set as indicated by the two-dot chain line instead of the solid line in FIG. 8. In this case, as indicated by the two-dot chain line in FIG. 9, the distribution pattern PBa, which is relatively small in horizontal diffusion angle and bright, is extended near to the vehicle while the distribution pattern PBb, which is relatively large in horizontal diffusion angle, is not extended far away from the vehicle. Hence, a light-distribution subpattern is formed wherein light beams are liable to be collected on the surface of the road in front of the vehicle, making it rather difficult to observe objects which are located far away from the vehicle on the right side.

Hence, it is desirable that, as shown in FIG. 8, the upper and lower border line L2 is located slightly below the level which divides the space between the optical axis Ax of the reflector 16 and the upper edge of the reflecting surface 22 into two parts.

What is claimed is:

1. A vehicle headlight comprising:

a discharge bulb, and a reflector having an optical axis and a reflecting surface for forwardly reflecting an output light of the discharge bulb, and for forming a light-distribution subpattern having an oblique cut line and a horizontal cut line, wherein said reflecting surface includes:

a first reflecting surface region disposed on a substantially upper half of said reflecting surface with respect to the optical axis of the reflector, said first reflecting surface region is designed so as to form the light-distribution subpattern with light reflected from the first reflecting surface region, and a second reflecting surface region located below the optical axis of the reflector, said second reflecting surface region reflects downwardly, in a deflection mode, light output from the discharge bulb, and reflects horizontally, in a diffusion mode, light output from the discharge bulb, so that light reflected from the second reflecting surface region forms, in a part of the light-distribution subpattern near a vehicle, a wide diffusion-distribution pattern which has a horizontal-diffusion angle larger than a horizontal-diffusion angle of the light-distribution subpattern.

2. The vehicle headlight according to claim 1, wherein the second reflecting surface region comprises a plurality of reflecting surface elements.

3. The vehicle headlight according to claim 2, wherein a shade is provided near the discharge bulb, the shade comprising a front end portion adapted to intercept light emitted forwardly from the discharge bulb, and a pair of legs through which the front end portion is secured to the reflector, and the upper edges of the pair of legs form the oblique cut line and the horizontal cut line, and the second reflecting surface region is a reflecting surface region which is located between the shadows of the pair of legs.

4. The vehicle headlight according to claim 2, wherein the vertical sections of the first and second reflecting surface regions are parabolic, and the parabolic axis of the second reflecting surface region is directed downwardly with respect to the parabolic axis of the first reflecting surface region.

5. The vehicle headlight according to claim 2, wherein the vertical sections of the first and second reflecting surface regions are parabolic, and the parabolic axis of the second reflecting surface region is located below the parabolic axis of the first reflecting surface region.

6. The vehicle headlight according to claim 2, wherein the vertical sections of the first and second reflecting surface regions are parabolic, and the parabolic focal length of the second reflecting surface region is longer than the parabolic focal length of the first reflecting surface region.

7. The vehicle headlight according to claim 1, wherein the vertical sections of the first and second reflecting surface regions are parabolic, and the parabolic axis of the second reflecting surface region is directed downwardly with respect to the parabolic axis of the first reflecting surface region.

8. The vehicle headlight according to claim 1, wherein the vertical sections of the first and second reflecting surface regions are parabolic, and the parabolic axis of the second reflecting surface region is located below the parabolic axis of the first reflecting surface region.

9. The vehicle headlight according to claim 1, wherein the vertical sections of the first and second reflecting surface regions are parabolic, and the parabolic focal length of the second reflecting surface region is longer than the parabolic focal length of the first reflecting surface region.

10. A reflector for a vehicle headlight comprising: a reflecting surface for forwardly reflecting an output light of a discharge bulb, and for forming a light-distribution subpattern having an oblique cut line and a horizontal cut line, wherein the reflecting surface includes:

a first reflecting surface region disposed on a substantially upper half of said reflecting surface with respect to the optical axis of the reflector, said first reflecting surface region is designed so as to form the light-distribution subpattern with light reflected from the first reflecting surface region, and a second reflecting surface region which is located below the optical axis of the reflector, said second reflecting surface region reflects downwardly, in a deflection mode, light output from the discharge bulb, and reflects horizontally, in a diffusion mode, light output from the discharge bulb, so that light reflected from the second reflecting surface region forms, in a part of the light-distribution subpattern near a vehicle, a wide diffusion-distribution pattern which has a horizontal-diffusion angle larger than a horizontal-diffusion angle of the light-distribution subpattern.

11. The reflector according to claim 10, wherein the second reflecting surface region comprises a plurality of reflecting surface elements.

12. The reflector according to claim 11, wherein the vertical sections of the first and second reflecting surface regions are parabolic, and the parabolic axis of the second reflecting surface region is directed downwardly with respect to the parabolic axis of the first reflecting surface region.

13. The reflector according to claim 11, wherein the vertical sections of the first and second reflecting surface regions are parabolic, and the parabolic axis of the second reflecting surface region is located below the parabolic axis of the first reflecting surface region.

14. The reflector according to claim 11, wherein the vertical sections of the first and second reflecting surface regions are parabolic, and the parabolic focal length of the second reflecting surface region is longer than the parabolic focal length of the first reflecting surface region.

15. The reflector according to claim 10, wherein the vertical sections of the first and second reflecting surface regions are parabolic, and the parabolic axis of the second reflecting surface region is directed downwardly with respect to the parabolic axis of the first reflecting surface region.

16. The reflector according to claim 10, wherein the vertical sections of the first and second reflecting surface regions are parabolic, and the parabolic axis of the second reflecting surface region is located below the parabolic axis of the first reflecting surface region.

17. The reflector according to claim 10, wherein the vertical sections of the first and second reflecting surface regions are parabolic, and the parabolic focal length of the second reflecting surface region is longer than the parabolic focal length of the first reflecting surface region.

* * * * *